(12) United States Patent
Zhang et al.

(10) Patent No.: US 8,080,781 B2
(45) Date of Patent: Dec. 20, 2011

(54) CONFIGURATION DESIGN OF DETECTOR SHIELDING FOR WIRELINE AND MWD/LWD DOWN-HOLE THERMAL NEUTRON POROSITY TOOLS

(75) Inventors: Qianmei Zhang, Katy, TX (US); Constantyn Chalitsios, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/721,665

(22) Filed: Mar. 11, 2010

(65) Prior Publication Data

US 2010/0230585 A1    Sep. 16, 2010

Related U.S. Application Data

(60) Provisional application No. 61/159,826, filed on Mar. 13, 2009.

(51) Int. Cl.
 *G01V 5/00*    (2006.01)
(52) U.S. Cl. ........................................................ 250/254
(58) Field of Classification Search .......... 250/253–264, 250/267–268, 269.1–269.8, 265–266
See application file for complete search history.

(56) References Cited

U.S. PATENT DOCUMENTS

| | | | |
|---|---|---|---|
| 3,621,255 A * | 11/1971 | Schwartz | 250/265 |
| 3,823,319 A * | 7/1974 | Tittman | 250/265 |
| 3,932,747 A | 1/1976 | Sherman | |
| 4,808,838 A | 2/1989 | Gold | |
| 4,937,446 A | 6/1990 | McKeon et al. | |
| 5,061,849 A | 10/1991 | Meisner et al. | |
| 5,581,079 A | 12/1996 | Mickael | |
| 5,608,215 A * | 3/1997 | Evans | 250/269.6 |
| 6,393,066 B1 | 5/2002 | Moretti et al. | |
| 2003/0209671 A1 | 11/2003 | Frederick et al. | |
| 2008/0105821 A1 | 5/2008 | Radtke et al. | |

FOREIGN PATENT DOCUMENTS

EP    0188878 A1    7/1986

OTHER PUBLICATIONS

Notification of Transmittal of the International Search Report and the Written Opinion of the International Searching Authority, or the Declaration; PCT/US2010/026994; Oct. 26, 2010.
Adolph, et al. "Saturation Monitoring With the RST Reservoir Saturation Tool". Oilfield Review. Jan. 1994. pp. 29-39.

* cited by examiner

*Primary Examiner* — Kiho Kim

(74) *Attorney, Agent, or Firm* — Cantor Colburn LLP

(57) ABSTRACT

An apparatus for estimating a property of an earth formation penetrated by a borehole, the apparatus includes: a carrier configured to be conveyed through the borehole; a neutron source disposed at the carrier and configured to irradiate the earth formation with neutrons; a neutron detector disposed at the carrier and configured to detect neutrons reflected by the earth formation to the detector; a neutron reflector disposed partially around the detector, an area of the detector not covered by the reflector being configured to admit the reflected neutrons; and a neutron absorber disposed at least around the reflector.

20 Claims, 5 Drawing Sheets

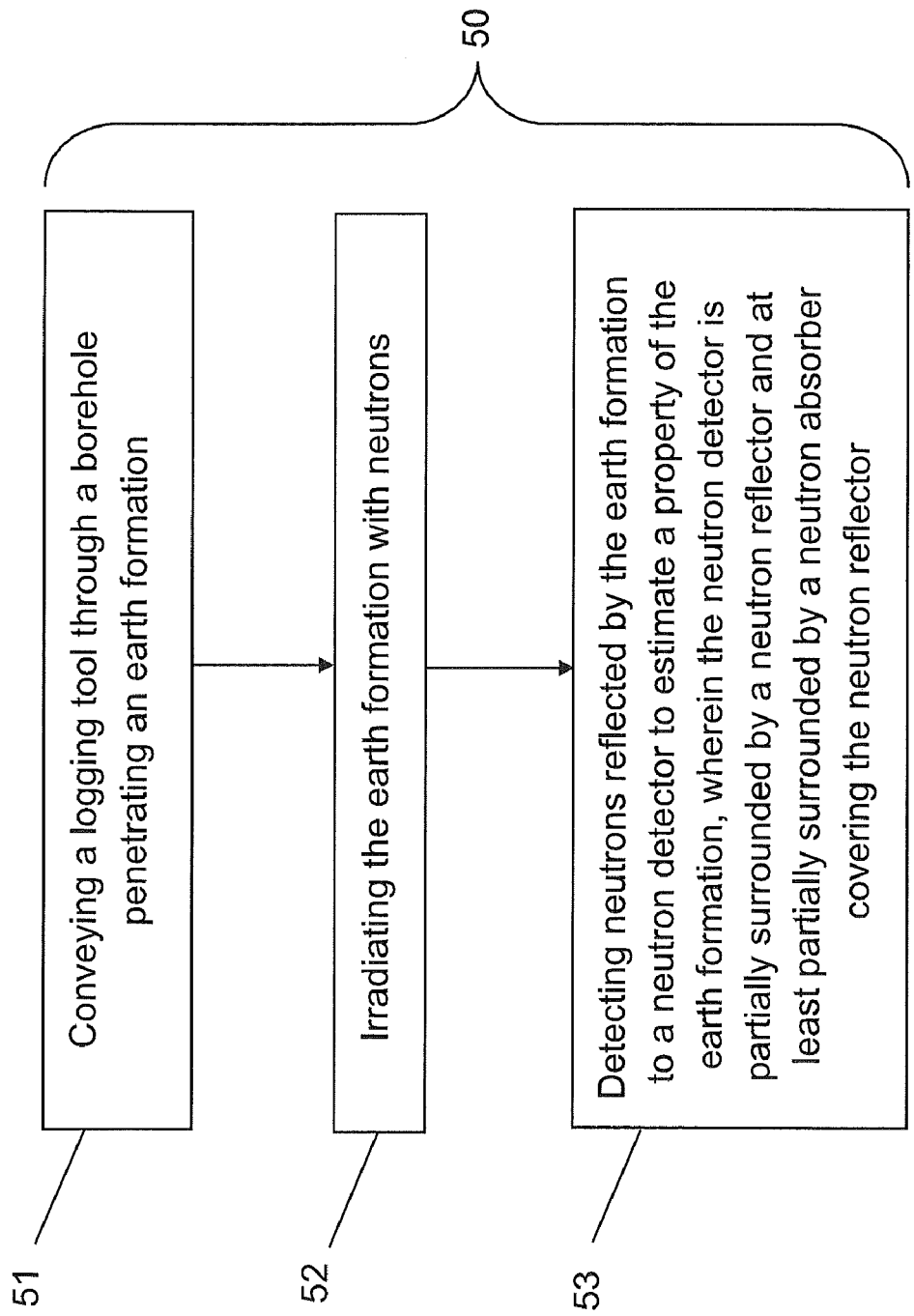

CONFIGURATION DESIGN OF DETECTOR SHIELDING FOR WIRELINE AND MWD/LWD DOWN-HOLE THERMAL NEUTRON POROSITY TOOLS

BACKGROUND OF THE INVENTION

1. Field of the Invention

The invention disclosed herein relates to measuring porosity of an earth formation and, in particular, to measuring with neutron porosity tools.

2. Description of the Related Art

Exploration and production of hydrocarbons requires that accurate and precise measurements of earth formations, which may contain reservoirs of the hydrocarbons. A borehole is typically drilled into an earth formation for the exploration and production.

Well logging is a technique used to perform measurements of an earth formation penetrated by the borehole. In one embodiment, referred to as logging-while-drilling, a logging tool is used to perform the measurements during drilling or during a temporary halt in drilling. The logging tool is attached to a drill string having a rotary cutting device. Thus, as the drill string rotates to turn the rotary cutting device, the logging tool also rotates with the drill string.

Various types of measurements can be performed using a logging tool. One type of measurement is used to estimate a porosity of the earth formation penetrated by the borehole. This type of measurement in one embodiment irradiates the earth formation with neutrons and measures an amount of neutrons reflected by the earth formation. Because an amount of reflective material present in the pores of the earth formation can determine the amount of neutrons that are reflected by the earth formation, the amount of reflected neutrons provides an estimate of the porosity of the earth formation. Thus, it is important to accurately measure the amount of reflected neutrons in order to accurately estimate the porosity of the earth formation under investigation.

Several challenges may occur in attempting to detect and/or measure neutrons in a borehole environment. One challenge is presented by a borehole fluid or drilling mud. The borehole fluid is present external to the logging tool. The drilling mud flows through a mud channel internal to a drill string to which the logging tool is attached. The borehole fluid or drilling mud can slow down neutrons for detection independent of the porosity of the formation. Thus, the amount of neutrons measured may not represent a correlation to the porosity of the formation.

To overcome the effects of the borehole fluid or the drilling mud, conventional logging tools may wrap a thin foil that absorbs neutrons around a neutron detector followed by a reflector material wrapped around the absorber foil. By optimizing the thickness of the absorber foil, the thermal neutron contribution to the detector from the borehole fluid or drilling mud would be mildly reduced and, at the same time, improve its detection efficiency to the neutrons from the formation. However, further reduction of the neutron's contribution from the borehole fluid or the drilling mud is nearly impossible with the conventional design. The reduction is nearly impossible with the conventional design because in order to reduce the contribution from the borehole fluid or the drilling mud, a relatively thicker absorber would be necessary. On the other hand, increasing the thickness of the absorber foil would result in fewer neutrons being reflected back because neutrons reflected back from the reflector material will have to penetrate the absorber foil twice without being absorbed.

Therefore, what are needed are techniques for significantly reducing or eliminating detected neutrons reflected from a borehole and/or mud channel and, therefore, accurately measuring those neutrons reflected only from an earth formation. Preferably, the techniques can be used in a logging tool disposed in a borehole penetrating the earth formation.

BRIEF SUMMARY OF THE INVENTION

Disclosed is an apparatus for estimating a property of an earth formation penetrated by a borehole, the apparatus includes: a carrier configured to be conveyed through the borehole; a neutron source disposed at the carrier and configured to irradiate the earth formation with neutrons; a neutron detector disposed at the carrier and configured to detect neutrons reflected by the earth formation to the detector; a neutron reflector disposed partially around the detector, an area of the detector not covered by the reflector being configured to admit the reflected neutrons; and a neutron absorber disposed at least around the reflector.

Also disclosed is an apparatus for detecting neutrons, the apparatus having: a neutron detector; a neutron reflector disposed partially around the detector, an area of the detector not covered by the reflector being configured to admit the neutrons; and a neutron absorber disposed at least around the reflector.

Further disclosed is a method for estimating a property of an earth formation penetrated by a borehole, the method includes: conveying a carrier through the borehole; irradiating the earth formation with neutrons emitted from a neutron source disposed at the carrier; and detecting the neutrons reflected from the earth formation with a neutron detector disposed at the carrier to estimate the property; wherein: a neutron reflector is disposed partially around the detector, an area of the detector not covered by the reflector being configured to admit the reflected neutrons; and a neutron absorber is disposed at least around the reflector.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 5 presents one example of a method for determining a property of an earth formation penetrated by a borehole.

DETAILED DESCRIPTION OF THE INVENTION

Figure 1:
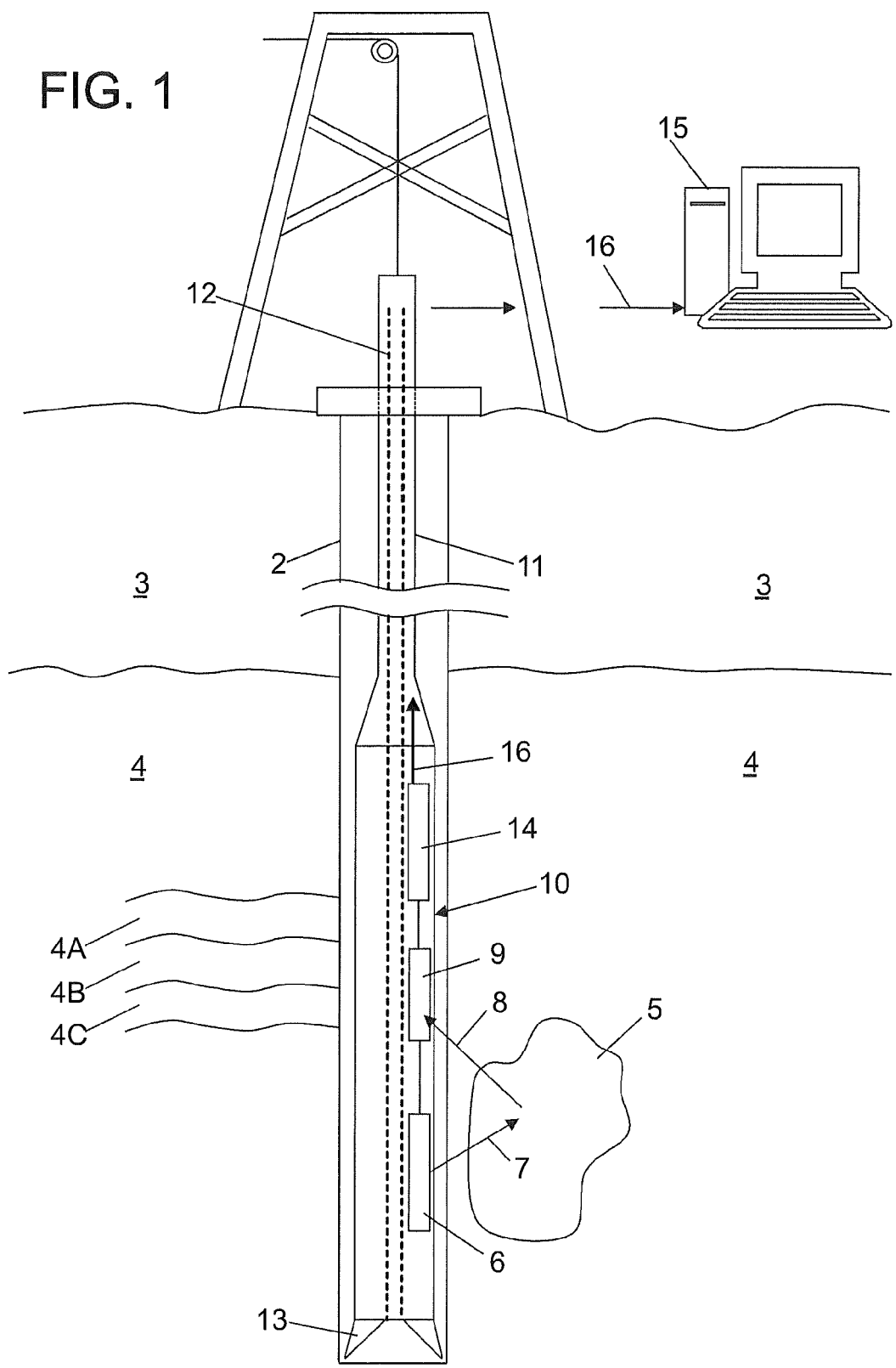
FIG. 1 illustrates an exemplary embodiment of a logging tool disposed in borehole penetrating an earth formation.

Disclosed are embodiments of techniques for determining a property of an earth formation penetrated by a borehole. The techniques, which include apparatus and method, irradiate the earth formation with neutrons and measure the neutrons that are reflected by the earth formation back to a detector in a logging tool. The property can be determined by an amount of neutrons detected.

The techniques disclosed herein provide a logging tool having a neutron reflector and a neutron absorber. The neutron reflector has a variable thickness and partially surrounds the outside of the neutron detector. In general, the thickest part of the reflector is disposed opposite of a window (i.e., opening) in the reflector. The window is the area through which the neutrons reflected by the earth formation are most likely to enter the detector. The neutron absorber also has a variable thickness and is disposed about outside of the neutron reflector. The thickest part of the neutron absorber is disposed between the detector and a mud channel or between the detector and an area of the borehole that has a maximum amount of borehole fluid. In general, the thickest part of the neutron absorber corresponds with a location having the thickest part of the neutron reflector. In order to measure epithermal neutrons, the absorber may completely surround the detector, in which case, the reflected neutrons pass through the absorber where the absorber is thinner than its thickest portion.

The variable thickness of the neutron reflector provides for increased reflection capability at the thickest part of the reflector where neutrons reflected by the formation are most likely to pass through the detector without detection. With increased probability of reflection at the reflector, the undetected neutrons are reflected back into the detector and are more likely to be detected. Thus, the thickest part of the neutron reflector is associated with reflecting undetected neutrons from a direction that formation reflected neutrons are most likely to travel if passing through the detector undetected. As the probability of neutrons entering the detector decreases with a direction, the thickness of the neutron reflector associated with that direction also decreases.

Similar to the neutron reflector, the neutron absorber has variable thickness to provide for increased neutron absorption capability where neutrons from either the drilling mud in the mud channel or the borehole fluid in the borehole are likely to enter the detector. Accordingly, the thickest part of the reflector is associated with a direction from which non-formation reflected neutrons are most likely to travel. As the probability of the non-formation reflected neutrons entering the detector from a certain direction decreases, the thickness of the neutron absorber associated with that certain direction decreases.

Variable thickness of the reflector and the absorber also provides reflector material and absorber material economy by placing the most reflector and absorber materials where these materials have the most utility.

The term "reflect" as used herein relates to an interaction, such as scattering, between a neutron and a material. The interaction causes the neutron to lose energy and change direction of travel. For example, the earth formation can be irradiated with neutrons from a neutron source that have a high kinetic energy greater than 0.1 MeV, also called "fast neutrons." The fast neutrons interact with material, such as minerals and fluids, in the earth formation. As a result of the interactions, the fast neutrons lose energy and become thermal neutrons or epithermal neutrons. Thermal neutrons have kinetic energy of about 0.025 eV. Epithermal neutrons have kinetic energy greater than thermal energy but less than about 100 eV. Some of the thermal and epithermal neutrons change a direction of travel to a direction that leads to the neutron detector, where these neutrons can be detected.

Reference may now be had to FIG. 1. FIG. 1 illustrates an exemplary embodiment of a logging tool 10 disposed in a borehole 2 penetrating the earth 3. The earth 3 includes an earth formation 4, which may include layers 4A-4C. In the embodiment of FIG. 1, the logging tool 10 is configured for logging-while-drilling (LWD) or measurement-while-drilling (MWD) applications. As such, the logging tool 10 is disposed in a collar at the distal end of drill string 11. Logging may be performed during drilling or during a temporary halt. In other embodiments, the logging tool 10 may be configured to be conveyed through the borehole 2 by a wireline, a slickline, or coiled tubing.

Referring to FIG. 1, during drilling operations, drilling mud is pumped from the surface of the earth 3 through a mud channel 12 in the drill string 11 to a cutting device 13 for lubrication and cooling. The drilling mud is discharged from the distal end of the drill string 11 into the borehole 2. In general, the drilling mud and borehole fluid have properties that cause the drilling mud or the borehole fluid to reflect neutrons. Accordingly, the logging tool 10 includes a configuration of a neutron reflector and a neutron absorber to minimize the effects of neutrons reflected by the drilling mud or the borehole fluid.

In the embodiment of FIG. 1, the logging tool 10 is configured to estimate the porosity of the formation 4. The porosity is measured by directing incident neutrons 7 to a region of investigation 5 in the formation 4. A neutron source 6 emits the incident neutrons 7. Depending on the properties of the formation 4, such as the porosity and the type of formation fluid disposed in the pores of the formation 4, a certain percentage of the incident neutrons 7 will be reflected back to the logging tool 10. The logging tool 10 includes a neutron detector 9 to detect and measure an amount of neutrons reflected by the formation 4 (i.e., reflected neutrons 8). The configuration of the neutron reflector and the neutron absorber at the logging tool 10 is optimized to increase the probability of detecting the reflected neutrons 8 and to minimize the effects on the detector 9 resulting from neutrons reflected by non-formation materials such as the drilling fluid and the borehole fluid.

The neutron source 6 can be a chemical source of neutrons or a pulsed neutron source. In general, the incident neutrons 7 are fast neutrons with energy greater than 0.1 MeV.

Referring to FIG. 1, the logging tool 10 includes an electronic unit 14 that is coupled to the detector 9. The electronic unit 14 is configured to receive measurements performed by the neutron detector 9. Data 16 associated with the measurements can be recorded by the electronic unit 14 and/or transmitted to a processing system 15 disposed at the surface of the earth 3. When the data 16 is recorded, the data 16 can be stored for later retrieval when the logging tool 10 is removed from the borehole 2. A telemetry system can be used for transmitting the data 16 to the processing system 15. Non-limiting examples of techniques the telemetry system uses to transmit the data 16 include pulsed-mud, wired drill pipe, acoustic, optical, and electromagnetic.

The processing system 15 receives and processes the data 16 to estimate a property of the formation 4. Non-limiting examples of the property include porosity and a location of a boundary between formation layers 4A-4C. In general, the property is presented to a drilling operator or petroanalyst to optimize drilling or formation analysis.

Figure 2:
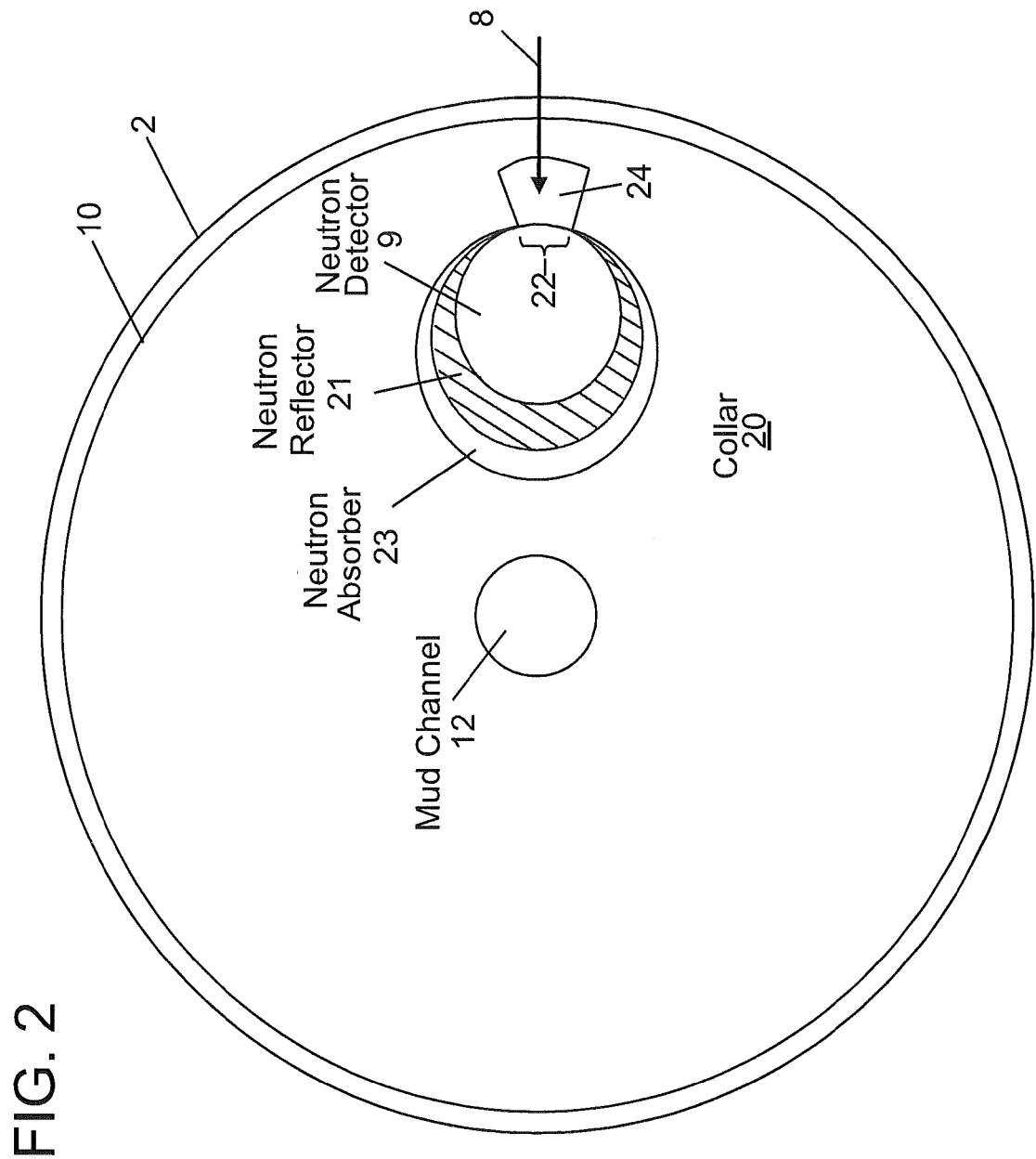
FIG. 2 depicts aspects of a neutron reflector and a neutron absorber disposed about a neutron detector configured for detecting thermal neutrons.

Embodiments of the neutron reflector and neutron absorber are now presented in more detail. Reference may now be had to FIG. 2. Shown in FIG. 2 is a top cross-sectional view of the logging tool 10. The mud channel 12 traverses the center of the logging tool 10 and contains material such as drilling mud, which may reflect neutrons toward the neutron detector 9. The neutron detector 9 is disposed off-center in a collar 20. The detector 9 is partially surrounded by a neutron reflector 21. Non-limiting examples of materials used in the neutron reflector 21 include graphite, beryllium, and aluminum. The portion of the detector 9 that is not surrounded by the neutron reflector 21 is referred to as a window 22. That is, the window 22 represents an opening in the reflector 21 through which the reflected neutrons 8 enter the detector 9. The reflector 21 in the embodiment of FIG. 2 has variable thickness and is crescent-shaped.

In the embodiment of FIG. 2, the reflector 21 is thickest opposite the window 22 through which the majority of the reflected neutrons 8 will pass. The thickness of the reflector 21 tapers to zero at a boundary with the window 22 where the reflected neutrons 8 are most unlikely to be reflected. Although not shown, the reflector 21 can cover the top and bottom of the detector 9. Thus, the detector 9 can be completely enclosed by the reflector 21 except for the window 22.

Referring to FIG. 2, the logging tool 10 includes a neutron absorber 23 that surrounds the neutron reflector 21. Non-limiting examples of the neutron absorber 23 include cadmium, gadolinium, and boron. In the embodiment of FIG. 2, the neutron absorber 23 and the neutron reflector 21 share the same window 22. Like the neutron reflector 21, the neutron absorber 23 also has variable thickness. The reflector 22 is thickest directly across from the mud channel 12, which would be the greatest source of reflected neutrons that were not reflected by the formation 4. Like the neutron reflector 21, the thickness of the neutron absorber 23 tapers to zero at a boundary with the window 22.

Referring to FIG. 2, the collar 20 is generally made of a metal, which can act as a shield to the reflected neutrons 8. Therefore, the window 22 is disposed adjacent to a space 24 that is void of the metal or shielding material. The space 24 is a region that allows for more of the reflected neutrons 8 to enter the detector 9 by not having material that would absorb or reflect the neutrons 8.

Figure 3:
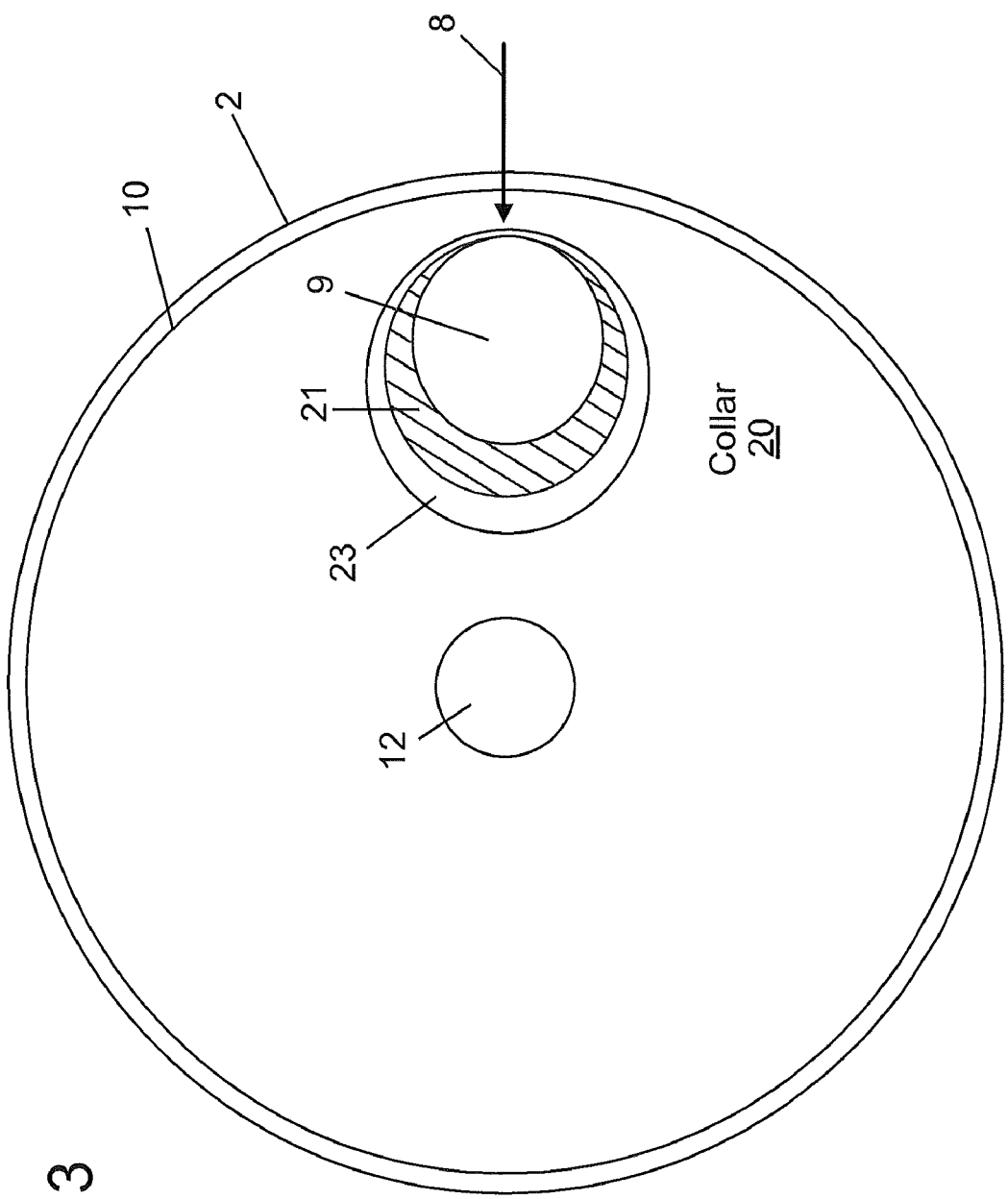
FIG. 3 depicts aspects of the neutron reflector and the neutron absorber disposed about the neutron detector configured for detecting epithermal neutrons.

Reference may now be had to FIG. 3. FIG. 3 illustrates a top cross-sectional view of an exemplary embodiment of the logging tool 10 configured for measuring epithermal neutrons reflected by the formation 4. In the embodiment of FIG. 3, as in FIG. 2, the neutron reflector 21 surrounds the neutron detector 9 except for the window 22. The neutron absorber 23 in FIG. 3 completely surrounds the detector 9 in order to absorb the reflected neutrons 8 that are thermal. The thickness of the neutron absorber 23 adjacent to the window 22 is optimized to absorb the thermal reflected neutrons 8 while allowing the epithermal reflected neutrons 8 to pass through the window 22 and into the detector 9.

Figure 4:
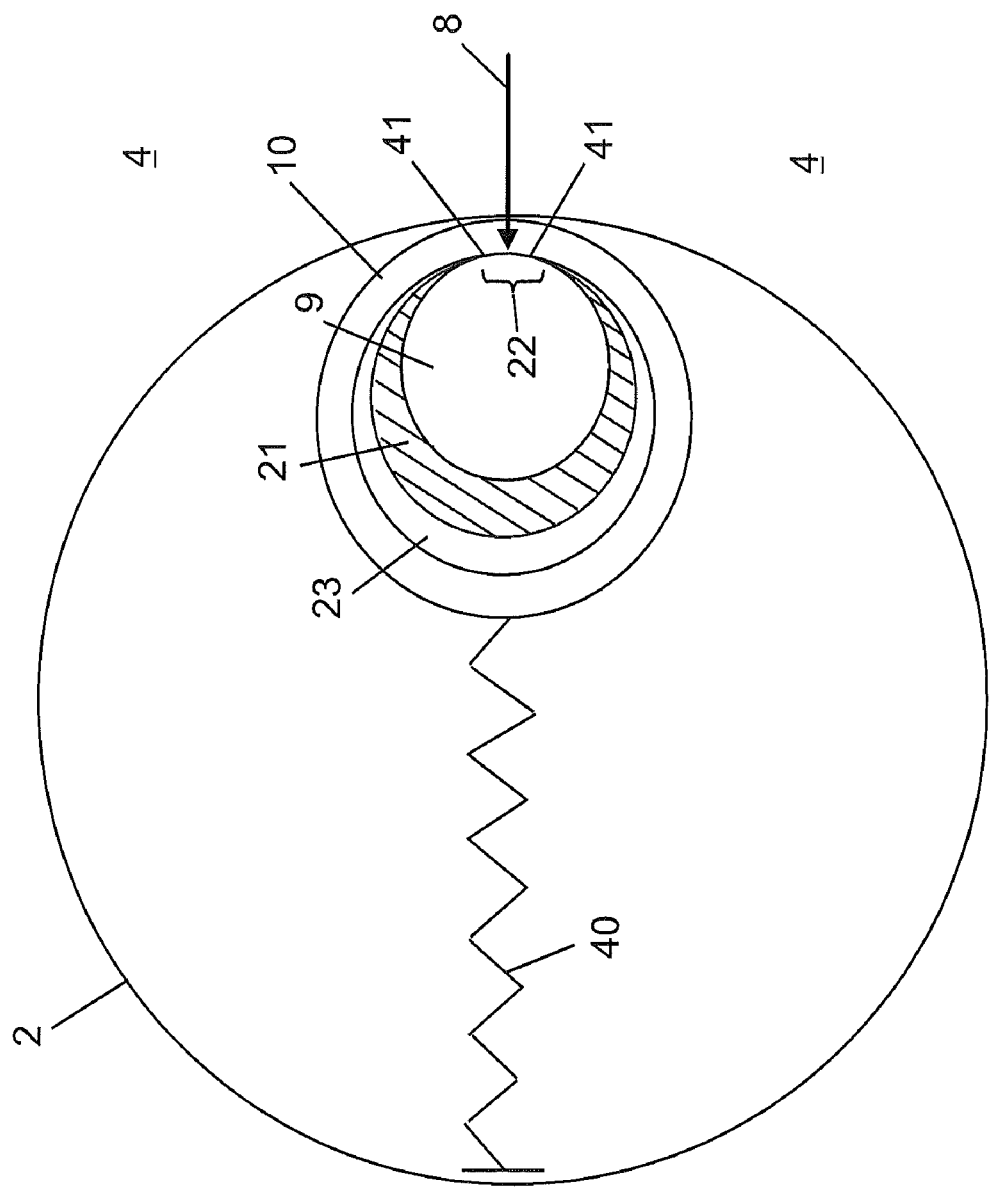
FIG. 4 depicts aspects of the neutron reflector and the neutron absorber in a logging tool configured for wireline logging.

FIG. 4 illustrates a top cross-sectional view of the logging tool 10 configured for wireline logging. Referring to FIG. 4, the logging tool 10 includes a decentralizer device 40, such as a spring, to place the logging tool 10 against the wall of the borehole 2. In general, the logging tool 10 is placed against the wall to minimize a distance from the neutron detector 9 to the wall. Thus, the amount of the borehole fluid between the detector 9 and the formation 4 is minimized. Accordingly, there is less borehole fluid to reflect the incident neutrons 7 to the detector 9 and affect the measurement of the neutrons 8 reflected by the formation 4. In the embodiment of FIG. 4, the neutron reflector 21 partially surrounds the neutron detector 9, leaving the window 22 uncovered. Further in the embodiment of FIG. 4, the neutron absorber 23 surrounds the reflector 21, leaving the window 22 uncovered. Both the reflector 21 and the absorber 23 have variable thickness that tapers to zero at boundaries 41 with the window 22. The reflector 21 in FIG. 4 has maximum thickness around the detector 9 opposite of the window 22. Similarly, the absorber 23 surrounding the reflector 21 has maximum thickness where the reflector 21 has maximum thickness. In general, the thickness of the absorber 23 at a location around the detector 9 corresponds to an amount of borehole fluid present at a corresponding location around the logging tool 10. For example, there is maximum borehole fluid at the region of the borehole 2 where the decentralizer device 40 is deployed pushing the logging tool 10 against the opposite region of the borehole 2. Therefore, the absorber 23 is thickest at the area of the detector 9 that is closest to the decentralizer device 40.

In the embodiment of FIG. 4, the logging tool 10 can detect thermal neutrons because neither the reflector 21 nor the absorber 23 covers the window 22. The logging tool 10 in FIG. 4 can be configured to detect epithermal neutrons by having the absorber 23 cover the window 22. The thickness of the absorber 23 covering the window 22 is optimized to absorb the thermal neutrons 8 while letting the epithermal neutrons 8 pass through.

FIG. 5 presents one example of a method 50 for estimating a property of the earth formation 4 penetrated by the borehole 2. The method 50 calls for (step 51) conveying the logging tool 10 through the borehole 2. Further, the method 50 calls for (step 52) irradiating the formation 4 with the neutrons 7. Further, the method 50 calls for (step 53) detecting the neutrons 8 that are reflected by the formation 4 to the neutron detector 9 to estimate the property wherein the detector 9 is partially surrounded by the neutron reflector 21 and at least partially surrounded by the neutron absorber 23 covering the reflector 21.

In support of the teachings herein, various analysis components may be used, including a digital system and/or an analog system. The system(s) may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force (such as a translational force, propulsional force or a rotational force), sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property of an earth formation penetrated by a borehole, the apparatus comprising:
    a carrier configured to be conveyed through the borehole;
    a neutron source disposed at the carrier and configured to irradiate the earth formation with neutrons;
    a neutron detector disposed at the carrier and configured to detect neutrons reflected by the earth formation to the detector;
    a neutron reflector disposed partially around the detector, an area of the detector not covered by the reflector being configured to admit the reflected neutrons; and
    a neutron absorber disposed at least around the reflector.

2. The apparatus of claim 1, wherein the reflector comprises a variable thickness.

3. The apparatus of claim 2, wherein the variable thickness tapers to zero at the area of the detector not covered by the reflector.

4. The apparatus of claim 3, wherein the reflector comprises a maximum thickness opposite of the area of the detector not covered by the reflector.

5. The apparatus of claim 1, wherein the reflector comprises a material selected from a group consisting of graphite, beryllium and aluminum.

6. The apparatus of claim 1, wherein the neutron absorber is further disposed covering the area of the detector not covered by the reflector.

7. The apparatus of claim 6, wherein the neutron absorber comprises a thickness and material configured to absorb epithermal neutrons.

8. The apparatus of claim 7, wherein the epithermal neutrons comprise energy in a range from 0.03 eV to 100 eV.

9. The apparatus of claim 7, wherein the neutron absorber is further configured to absorb thermal neutrons.

10. The apparatus of claim 1, wherein the neutron absorber comprises a material selected from a group consisting of cadmium and gadolinium.

11. The apparatus of claim 1, wherein the logging tool is disposed adjacent to a mud channel, the neutron absorber comprising a variable thickness with a thickest portion being disposed between the mud channel and the neutron detector.

12. The apparatus of claim 11, wherein the thickness of the neutron absorber decreases going away from the mud channel.

13. The apparatus of claim 1, wherein the neutron source is selected from a group consisting of a chemical and a neutron generator.

14. The apparatus of claim 1, wherein the area of the detector not covered by the reflector is disposed adjacent to a region configured to pass the reflected neutrons to the neutron detector.

15. The apparatus of claim 1, wherein the carrier comprises at least one selection from a group consisting of a logging tool, a wireline, a slickline, coiled tubing, and a drill string.

16. The apparatus of claim 1, wherein the property is selected from a group consisting of porosity and a boundary between layers in the earth formation.

17. An apparatus for detecting neutrons, the apparatus comprising:
    a neutron detector;
    a neutron reflector disposed partially around the detector, an area of the detector not covered by the reflector being configured to admit the neutrons; and
    a neutron absorber disposed at least around the reflector.

18. A method for estimating a property of an earth formation penetrated by a borehole, the method comprising:
    conveying a carrier through the borehole;
    irradiating the earth formation with neutrons emitted from a neutron source disposed at the carrier; and
    detecting the neutrons reflected from the earth formation with a neutron detector disposed at the carrier to estimate the property;
    wherein:
        a neutron reflector is disposed partially around the detector, an area of the detector not covered by the reflector being configured to admit the reflected neutrons; and
        a neutron absorber is disposed at least around the reflector.

19. The method of claim 18, wherein the detecting comprises measuring an amount of neutrons detected.

20. The method of claim 19, wherein the amount of neutrons is measured during a time interval.

* * * * *